United States Patent
Walston et al.

(10) Patent No.: US 9,896,954 B2
(45) Date of Patent: Feb. 20, 2018

(54) DUAL-WALLED CERAMIC MATRIX COMPOSITE (CMC) COMPONENT WITH INTEGRAL COOLING AND METHOD OF MAKING A CMC COMPONENT WITH INTEGRAL COOLING

(71) Applicant: Rolls-Royce Corporation, Indianapolis, IN (US)

(72) Inventors: Jeffrey A. Walston, Indianapolis, IN (US); Sean Landwehr, Avon, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 168 days.

(21) Appl. No.: 14/881,864

(22) Filed: Oct. 13, 2015

(65) Prior Publication Data
US 2016/0101561 A1    Apr. 14, 2016

Related U.S. Application Data

(60) Provisional application No. 62/063,768, filed on Oct. 14, 2014.

(51) Int. Cl.
*B23K 31/02* (2006.01)
*F01D 11/00* (2006.01)
(Continued)

(52) U.S. Cl.
CPC .......... *F01D 11/003* (2013.01); *B23K 1/0018* (2013.01); *B32B 1/00* (2013.01);
(Continued)

(58) Field of Classification Search
CPC .......... F01D 11/003; F01D 5/18; F01D 5/284; F01D 9/02; C04B 37/005;
(Continued)

(56) References Cited

U.S. PATENT DOCUMENTS 6,003,754 A    12/1999 Rhodes
6,451,416 B1 *  9/2002 Holowczak ............. B32B 18/00
                                                        264/125
(Continued)

FOREIGN PATENT DOCUMENTS

JP    2014079990 A  *  5/2014  ....... H01L 21/67103

*Primary Examiner* — Kiley Stoner
(74) *Attorney, Agent, or Firm* — Brinks Gilson & Lione

(57) ABSTRACT

A dual-walled ceramic matrix composite (CMC) component comprises: a CMC core having a hollow shape enclosing at least one interior channel; and a CMC outer layer overlying and spaced apart from the CMC core by a ceramic slurry-cast architecture positioned therebetween. Each of the CMC core and the CMC outer layer comprises ceramic fibers in a ceramic matrix. The CMC core further includes a plurality of through-thickness inner cooling holes in fluid communication with the at least one interior channel. The ceramic slurry-cast architecture defines a cooling fluid path over an outer surface of the CMC core that connects the interior channel(s) to an external environment of the dual-walled CMC component. The CMC outer layer may also include a plurality of through-thickness outer cooling holes in fluid communication with the cooling fluid path, thereby extending the cooling fluid path through the CMC outer layer.

15 Claims, 3 Drawing Sheets

(51) Int. Cl.

| | | |
|---|---|---|
| *B32B 1/08* | (2006.01) | |
| *B32B 3/26* | (2006.01) | |
| *B32B 18/00* | (2006.01) | |
| *F01D 5/14* | (2006.01) | |
| *F01D 9/02* | (2006.01) | |
| *B23K 1/00* | (2006.01) | |
| *F23R 3/00* | (2006.01) | |
| *B32B 5/02* | (2006.01) | |
| *B32B 5/22* | (2006.01) | |
| *B32B 5/26* | (2006.01) | |
| *B32B 7/04* | (2006.01) | |
| *B32B 1/00* | (2006.01) | |
| *B32B 3/08* | (2006.01) | |
| *F01D 5/18* | (2006.01) | |
| *F01D 5/28* | (2006.01) | |
| *C04B 37/00* | (2006.01) | |
| *B29L 31/08* | (2006.01) | |
| *B23K 101/00* | (2006.01) | |

(52) U.S. Cl.
CPC ............... *B32B 1/08* (2013.01); *B32B 3/08* (2013.01); *B32B 3/266* (2013.01); *B32B 5/02* (2013.01); *B32B 5/022* (2013.01); *B32B 5/024* (2013.01); *B32B 5/22* (2013.01); *B32B 5/26* (2013.01); *B32B 7/045* (2013.01); *B32B 18/00* (2013.01); *C04B 37/005* (2013.01); *F01D 5/147* (2013.01); *F01D 5/18* (2013.01); *F01D 5/284* (2013.01); *F01D 9/02* (2013.01); *F23R 3/002* (2013.01); *F23R 3/007* (2013.01); *B23K 2201/001* (2013.01); *B29L 2031/08* (2013.01); *B32B 2255/02* (2013.01); *B32B 2255/20* (2013.01); *B32B 2260/021* (2013.01); *B32B 2260/04* (2013.01); *B32B 2260/044* (2013.01); *B32B 2262/105* (2013.01); *B32B 2307/306* (2013.01); *B32B 2307/308* (2013.01); *B32B 2307/50* (2013.01); *B32B 2307/718* (2013.01); *B32B 2581/00* (2013.01); *B32B 2603/00* (2013.01); *C04B 2235/3418* (2013.01); *C04B 2235/5244* (2013.01); *C04B 2235/5436* (2013.01); *C04B 2235/616* (2013.01); *C04B 2237/083* (2013.01); *C04B 2237/365* (2013.01); *C04B 2237/38* (2013.01); *C04B 2237/592* (2013.01); *C04B 2237/597* (2013.01); *C04B 2237/60* (2013.01); *C04B 2237/61* (2013.01); *C04B 2237/62* (2013.01); *C04B 2237/84* (2013.01); *F05D 2240/127* (2013.01); *F05D 2260/2212* (2013.01); *F05D 2300/6033* (2013.01); *F23R 2900/00018* (2013.01); *F23R 2900/03041* (2013.01); *F23R 2900/03044* (2013.01)

(58) Field of Classification Search
CPC ...... C04B 2235/5244; C04B 2237/597; C04B 2235/5436; C04B 2235/616; C04B 2235/3418; C04B 2237/38; C04B 2237/083; C04B 2237/365; C04B 2237/84; C04B 2237/62; C04B 2237/61; C04B 2237/592; C04B 2237/60; B32B 5/26; B32B 3/08; B32B 5/22; B32B 5/024; B32B 5/022; B32B 5/02; B32B 1/00; B32B 7/045; B32B 3/007; B32B 3/002; B32B 18/00; B32B 3/266; B32B 1/08; B32B 2307/306; B32B 2255/02; B32B 2260/021; B32B 2260/04; B32B 2260/044; B32B 2262/105; B32B 2255/20; B32B 2307/308; B32B 2307/718; B32B 2307/50; B32B 2581/00; B32B 2603/00; F23R 3/007; F23R 3/002; F23R 2900/03044; F23R 2900/03041; F23R 2900/00018; B23K 1/008; B23K 1/0018; B23K 2201/001; F05D 2300/6033; F05D 2260/2212; F05D 2240/127; B29L 2031/08
USPC .................. 228/248.1–248.5, 159–163; 29/889.1–889.722
See application file for complete search history.

(56) References Cited

U.S. PATENT DOCUMENTS

| | | | |
|---|---|---|---|
| 6,497,776 B1* | 12/2002 | Butler | B32B 18/00 156/145 |
| 6,610,385 B2 | 8/2003 | Cairo | |
| 6,709,230 B2* | 3/2004 | Morrison | F01D 5/189 415/115 |
| 7,479,302 B2 | 1/2009 | Steffier | |
| 8,257,809 B2 | 9/2012 | Morrison et al. | |
| 2003/0223861 A1* | 12/2003 | Morrison | F01D 5/189 415/115 |
| 2006/0226290 A1* | 10/2006 | Campbell | F01D 5/146 244/123.1 |
| 2006/0285973 A1* | 12/2006 | Keller | F01D 5/147 416/97 R |
| 2007/0048144 A1* | 3/2007 | Morrison | C04B 41/009 416/224 |
| 2007/0140835 A1* | 6/2007 | Albrecht | F01D 5/147 415/115 |
| 2007/0147996 A1* | 6/2007 | Campbell | F01D 5/08 416/95 |
| 2008/0181766 A1* | 7/2008 | Campbell | F01D 5/14 415/116 |
| 2009/0003993 A1* | 1/2009 | Prill | F01D 5/284 415/134 |
| 2010/0032875 A1* | 2/2010 | Merrill | B28B 1/008 264/642 |
| 2011/0151248 A1* | 6/2011 | Manicke | C08K 3/04 428/339 |
| 2011/0158820 A1 | 6/2011 | Chamberlain et al. | |
| 2012/0189427 A1 | 7/2012 | Kwon et al. | |
| 2014/0271153 A1* | 9/2014 | Uskert | F01D 5/187 415/177 |
| 2015/0152013 A1* | 6/2015 | Liu | C04B 35/62222 427/58 |
| 2015/0307402 A1* | 10/2015 | Cai | B02C 15/00 428/34.4 |
| 2015/0321382 A1* | 11/2015 | Jarmon | F01D 5/00 60/796 |
| 2016/0115086 A1* | 4/2016 | Tuertscher | C04B 35/573 264/29.1 |
| 2016/0201479 A1* | 7/2016 | Abbott | F01D 5/282 416/229 A |
| 2016/0214907 A1* | 7/2016 | Shim | C04B 41/5045 |
| 2016/0264476 A1* | 9/2016 | Keith | B32B 18/00 |
| 2017/0016335 A1* | 1/2017 | Kirby | F01D 5/147 |
| 2017/0029339 A1* | 2/2017 | Weaver | B05D 7/24 |
| 2017/0029340 A1* | 2/2017 | Weaver | C04B 35/80 |
| 2017/0057879 A1* | 3/2017 | Harris | C04B 35/803 |
| 2017/0144329 A1* | 5/2017 | Dunn | B28B 1/14 |
| 2017/0144925 A1* | 5/2017 | Dunn | C03C 17/001 |
| 2017/0159459 A1* | 6/2017 | Courcot | F01D 5/284 |

* cited by examiner

DUAL-WALLED CERAMIC MATRIX COMPOSITE (CMC) COMPONENT WITH INTEGRAL COOLING AND METHOD OF MAKING A CMC COMPONENT WITH INTEGRAL COOLING

RELATED APPLICATIONS

The present patent document claims the benefit of priority under 35 U.S.C. § 119(e) to U.S. Provisional Patent Application No. 62/063,768, filed on Oct. 14, 2014, which is hereby incorporated by reference in its entirety.

TECHNICAL FIELD

The present disclosure relates to ceramic matrix composite (CMC) preparation and more particularly to a method of forming high temperature CMC structures with cooling capabilities.

BACKGROUND

Ceramic matrix composites, which include ceramic fibers embedded in a ceramic matrix, exhibit a combination of properties that make them promising candidates for industrial applications that demand excellent thermal and mechanical properties along with low weight, such as gas turbine engine components. Existing CMCs and turbine engine components systems have various shortcomings, however, such as the ability to function at high temperatures without sacrificing structural stability. As CMC parts see increasing use as replacements for current metallic flowpath components in turbine engines, CMC-compatible cooling techniques are becoming increasingly important. Various cooling schemes have been attempted for CMC components, such as the placement of a series of continuous tubes into the fibrous preform of the composite during fabrication. It would be advantageous to develop a CMC component with integral cooling capabilities that can maintain a more uniform operating temperature, particularly for complex geometric parts.

BRIEF SUMMARY

A dual-walled ceramic matrix composite (CMC) component comprises: a CMC core having a hollow shape enclosing at least one interior channel; and a CMC outer layer overlying and spaced apart from the CMC core by a ceramic slurry-cast architecture positioned therebetween. Each of the CMC core and the CMC outer layer comprises ceramic fibers in a ceramic matrix. The CMC core further includes a plurality of through-thickness inner cooling holes in fluid communication with the at least one interior channel. The ceramic slurry-cast architecture defines a cooling fluid path over an outer surface of the CMC core that connects the interior channel(s) to an external environment of the dual-walled CMC component. The CMC outer layer may also include a plurality of through-thickness outer cooling holes in fluid communication with the cooling fluid path, thereby extending the cooling fluid path through the CMC outer layer.

A method of forming a CMC component with enhanced cooling entails positioning a preform comprising a rigidized framework of ceramic fibers within a mold having an inner surface comprising a plurality of protrusions. The preform has a hollow shape enclosing at least one interior channel. A slurry comprising particulate solids in a flowable carrier is introduced into the mold. The slurry (a) infiltrates the rigidized framework of ceramic fibers; and (b) flows over an outer surface of the preform and around the plurality of protrusions. The flowable carrier is removed from the slurry, and the particulate solids (a) remain in the rigidized framework of ceramic fibers and (b) are deposited on the outer surface of the preform between the protrusions, thereby forming a slurry-cast architecture on the outer surface of the preform. The mold is removed, and a plurality of through-thickness cooling holes are formed in the preform. The cooling holes form a cooling fluid path from the interior channel through the slurry-cast architecture and out of the preform. The preform is infiltrated with a molten material to form a CMC core. The method further comprises bonding a ceramic outer layer to the preform before or after melt-infiltration of the preform. The ceramic outer layer is also melt-infiltrated to form a CMC outer layer, and through-thickness cooling holes may be formed in the CMC outer layer to extend the cooling fluid path through the CMC outer layer. Thus, an integrally-cooled, dual-wall CMC component is formed.

DETAILED DESCRIPTION

Described herein is a method of manufacturing a ceramic matrix composite component having an integral cooling strategy which may be effective for maintaining a more uniform part temperature. Also described is a dual-walled CMC component suitable for high-temperature applications that includes an integral cooling pathway. The integrally-cooled CMC component may be able to avoid high thermal gradients during use as well as provide excellent out-of-plane strength and stiffness due to the dual-layer structure. The out-of-plane bending strength of the dual-walled component may also benefit from the increased strength of a monolithic ceramic (e.g., SiC) interlayer, as described below, compared to the interlaminar tensile strength of current SiC-SiC composites. As an added benefit, the dual-walled component may provide alternative ways to address trailing edge formation for a CMC airfoil compared to single-wall construction.

Figure 1:
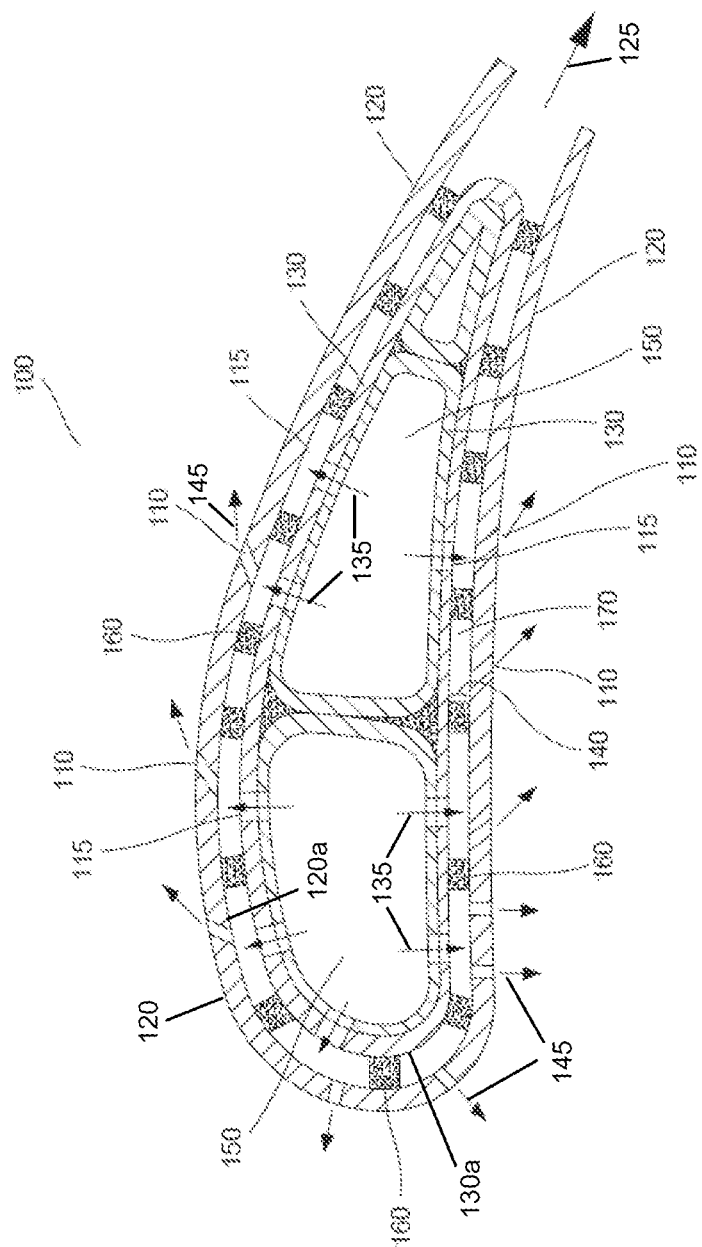
FIG. 1 is a schematic of an exemplary dual-walled CMC component having integral cooling.

Referring to the cross-sectional schematic of FIG. 1, a dual-walled CMC component 100 comprises a CMC core 130 having a hollow shape enclosing an interior channel 150. A CMC outer layer 120 overlies and is spaced apart from the CMC core 130 by a ceramic slurry-cast architecture 160 positioned therebetween. Each of the CMC core 130 and the CMC outer layer 120 comprises ceramic fibers in a ceramic matrix. The CMC core 130 includes a plurality of through-thickness inner cooling holes 115 in fluid communication with the interior channel 150. The slurry-cast architecture 160 defines a cooling fluid path 135 over an outer surface 130a of the CMC core 130 that connects the interior channel 150 to an external environment 125 of the dual-walled CMC component 100. The cooling may be effected by air or another cooling fluid passing along the cooling fluid path 135.

The CMC outer layer 120 may also include a plurality of through-thickness outer cooling holes 110 in fluid communication with the cooling fluid path 135, thereby extending the cooling fluid path 135,145 through the CMC outer layer 120. The ceramic slurry-cast architecture 160 may comprise a plurality of ceramic pedestal features 140 extending from the outer surface 130a of the CMC core 130 to an inner surface 120a of the CMC outer layer 120. The ceramic pedestal features 140 are separated by recessed regions 170 and may have a predetermined shape and spacing for optimizing the cooling fluid path and promoting effective cooling. For example, the shape and spacing may be determined by a molding process and/or a machining process prior to bonding the CMC outer layer 120 to the CMC core 130, as described below.

The through-thickness inner cooling holes 115 may extend entirely through the thickness of the CMC core 130, and the through-thickness outer cooling holes (when present) 110 may extend entirely through the thickness of the CMC outer layer 120, such that the depth (D) of a given cooling hole corresponds to the thickness of the CMC core or the CMC outer layer. The cooling holes 115,110 may have a discrete shape in which the width (W) of a given hole is similar to (or the same as) the length (L) of that hole. For example, the inner and/or outer cooling holes 115,110 may have a circular transverse cross-section. In another example, some or all of the inner and/or outer cooling holes 115,110 may have a length that is much longer than the width of the hole (e.g., $L \geq 5 \cdot W$). Generally speaking, the transverse cross-sectional area of the inner cooling holes 115 and the outer cooling holes 110 is at least about $1.8 \times 10^{-4}$ in$^2$ per hole to avoid clogging. The area can be much greater depending on the shape of the hole (e.g., circular versus elongated slit). The cooling holes 115,110 may be arranged randomly or in a predetermined pattern in the CMC core 130 and (optionally) in the CMC outer layer 120, thereby forming an integral cooling pathway through the dual-walled CMC component 100.

Advantageously, the dual-walled CMC component 100 may be a gas turbine engine component, such as a blade or vane. The ceramic matrix and the ceramic fibers of the CMC core 130 and the CMC outer layer 120 typically comprise silicon carbide, but may also or alternatively comprise another ceramic or high-temperature material, as discussed further below. The ceramic slurry-cast architecture 160 may also comprise a ceramic such as silicon carbide.

Figure 2:
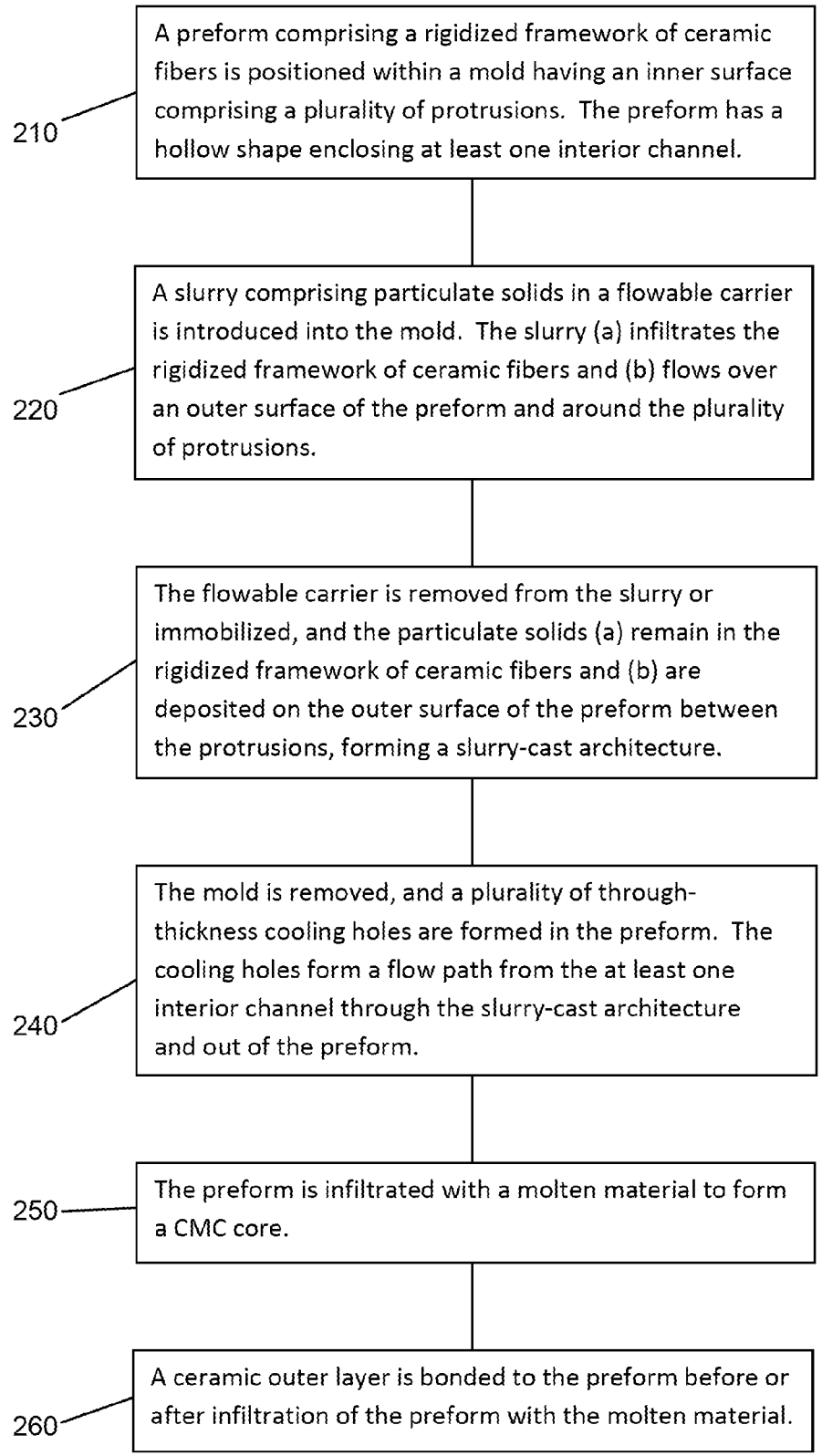
FIG. 2 is a flow chart showing steps in a method to produce an integrally-cooled CMC component.

A method of making a CMC component with integral cooling, such as the exemplary component of FIG. 1, is described in reference to the flow chart of FIG. 2.

Figure 3:
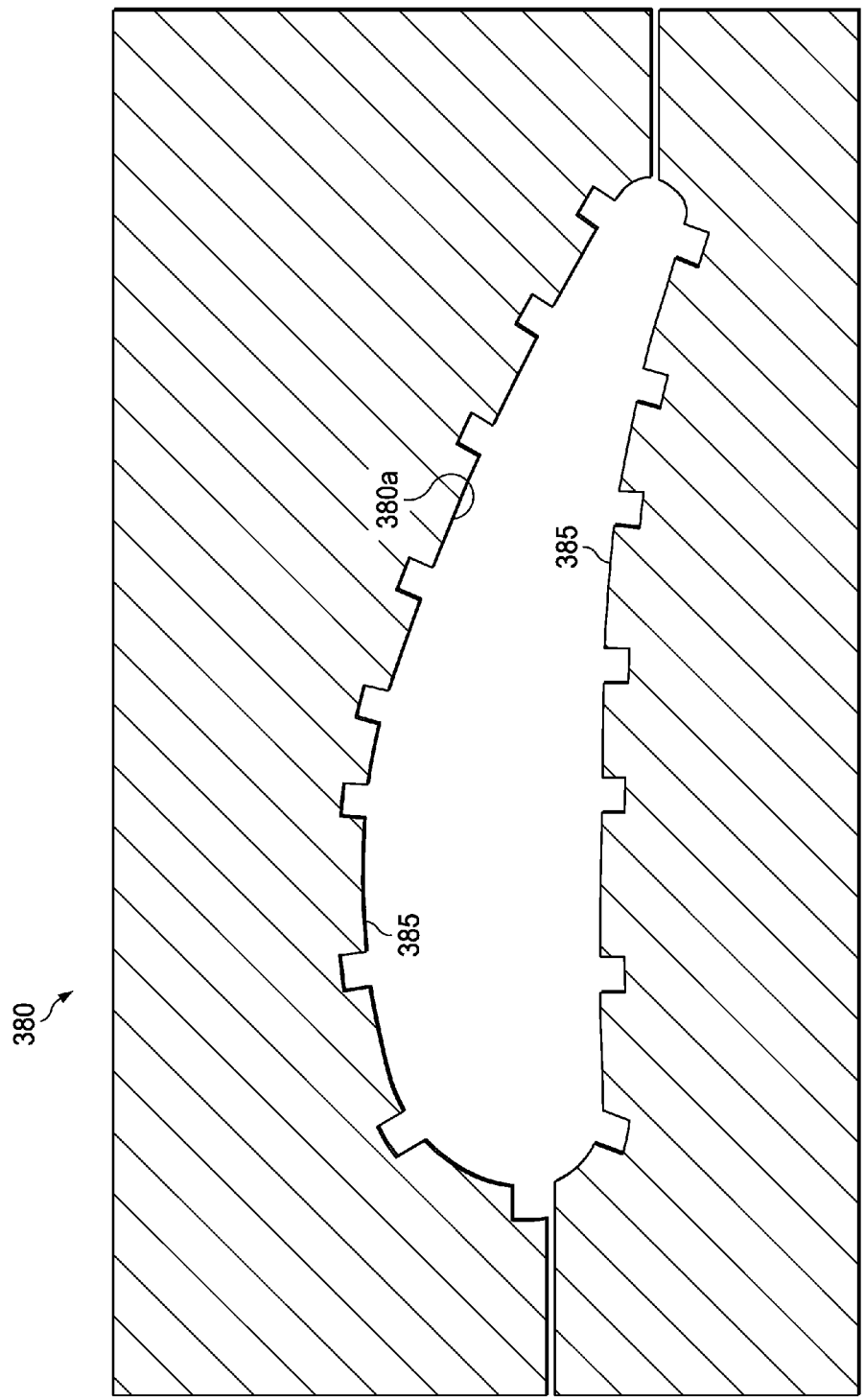
FIG. 3 is a schematic of an exemplary mold that may be used in the fabrication of the dual-walled CMC component shown in FIG. 1.

The method may entail positioning 210 a preform comprising a rigidized framework of ceramic fibers within a mold 380 having an inner surface 380a comprising a plurality of protrusions 385, as shown in FIG. 3. The preform has a hollow shape enclosing at least one interior channel. The mold may be a multi-piece mold designed to fit around the preform such that the protrusions contact the outer surface of the preform. The protrusions may be formed in the inner surface of the mold by, for example, machining and/or surface-roughening.

Referring again to the flow chart of FIG. 2, a slurry comprising particulate solids in a flowable carrier (e.g., solvent or binder) is introduced 220 into the mold. The slurry infiltrates the rigidized framework of ceramic fibers and flows over the outer surface of the preform (and around the plurality of protrusions), partially or completely filling empty space between the outer surface of the preform and the inner surface of the mold. The introduction of the slurry may be carried out at room temperature or an elevated temperature by slurry infiltration, injection molding, gel casting, or another method known in the art.

Next, the flowable carrier may be removed from the slurry (e.g., in the case of water or an alcohol) or may be immobilized (e.g., in the case of a polymer) 230. The particulate solids (a) remain in the rigidized framework of ceramic fibers and (b) are deposited on the outer surface of the preform between the protrusions as a slurry-cast architecture. In one embodiment, as shown in FIG. 1, the slurry-cast architecture 160 comprises slurry-cast pedestal features 140 separated by recessed regions 170 that are defined by the protrusions 385 of the mold 380, which is illustrated in FIG. 3. The inner surface 380a of the mold 380 may be a negative of the desired slurry-cast architecture 160. The recessed regions 170 may be entirely devoid of the particulate solids or may contain a lesser amount of particulate solids (in terms of height or thickness) than the slurry-cast pedestal features 140. Whether the flowable carrier is removed or immobilized at this point in the process may depend on the composition of the slurry and the method used to introduce the slurry into the mold. In a typical slurry infiltration process that utilizes a carrier which is flowable at room temperature (such as water or an alcohol), the flowable carrier may be removed shortly or immediately after slurry infiltration by drying at an elevated temperature or at room temperature. If the flowable carrier comprises one or more molten polymers used for injection molding of the slurry, then the flowable carrier may be immobilized (e.g., by cooling) to form one or more solid polymers that can act as a binder for the particulate solids. The solid polymer(s) may be removed at a later time before melt infiltration.

After removal or immobilization of the flowable carrier, the mold may be disassembled and/or removed to expose the preform including the slurry-cast architecture for further processing, such as machining. At this point in the process, the preform may be referred to as "the slurry-cast preform," or simply as "the preform".

A plurality of inner cooling holes may be formed 240 in the preform to create a cooling fluid path from the interior channel through the slurry-cast architecture and out of the preform. The through-thickness inner cooling holes may be formed by boring or drilling into the preform before or after the slurry-cast architecture is formed. The slurry-cast architecture (e.g., the slurry-cast pedestal features) may be machined to the desired shape and/or tolerances to accommodate the size and curvature of a porous ceramic outer layer to be attached thereto.

The method further comprises infiltration 250 of the slurry-cast preform with a molten material such as silicon or a silicon alloy. Upon cooling, a CMC core comprising the ceramic fibers of the preform in a ceramic matrix is formed. The ceramic matrix may include a residual amount—typically less than about 5 wt. %—of unreacted metal or alloy.

A ceramic outer layer is bonded 260 to the preform before or after infiltration of the preform with the molten material. The slurry-cast architecture may serve as an interlayer that can facilitate bonding while also acting as a porous spacer layer that provides a fluid flow path for cooling.

In one example, the bonding may entail wrapping a prepreg tape around the slurry-cast preform (prior to melt-infiltration) and heating the prepreg tape. The prepreg tape typically comprises a woven mat of interphase-coated ceramic fibers in a polymeric binder. Heating the prepreg tape to a temperature near the glass transition temperature of the binder softens the binder, allowing for attachment of the tape to the slurry-cast preform. The heating may be carried out in a mold. Upon exposure to higher temperatures (e.g., several hundred degrees Celsius) the binder is pyrolyzed, leaving a porous ceramic outer layer bonded to the slurry-cast preform.

The method may further comprise infiltration of the ceramic outer layer with a molten material as described above to form a melt-infiltrated outer layer. Upon cooling, a CMC outer layer is formed. The infiltration of the slurry-cast preform and the porous ceramic outer layer with the molten material may be carried out simultaneously after the two are bonded together. For example, the slurry-cast preform and the porous ceramic outer layer, bonded together as described above, may be at least partially immersed in a molten material for infiltration, and then cooled. A dual-walled CMC component comprising a CMC outer layer bonded to a CMC core may thus be formed. After melt infiltration and cooling, the slurry-cast architecture may be described as a ceramic slurry-cast architecture defining a cooling fluid path between the CMC core and the CMC outer layer.

Alternatively, infiltration of the slurry-cast preform and the ceramic outer layer with a molten material may be carried out separately to independently form a CMC core and a CMC outer layer. In this case, machining of the slurry-cast architecture and/or bonding of the outer layer to the core may occur after melt infiltration. The CMC outer layer may be bonded to the CMC core by a method such as reactive brazing or diffusion bonding in order to form the dual-walled CMC component.

The method may further entail forming a plurality of through-thickness holes (e.g., by drilling, boring, or another method) into the CMC outer layer, thereby extending the cooling fluid path from the interior channel through the CMC outer layer.

The dual-walled CMC component produced by the above-described method may be a blade or vane (e.g., a rotating turbine blade) of a gas turbine engine that has an integral cooling pathway. Alternatively, the CMC component may be a combustor liner, seal segment, or other static or rotating turbine component. The CMC component 100 may have any simple or complex geometric shape, such as a curved aerodynamic shape as shown in FIG. 1. One or more additional machining steps may be used to obtain the desired geometric shape of the dual-walled CMC component.

The preform comprising the rigidized framework of ceramic fibers that is positioned in the mold at the start of the process can be constructed from an arrangement of woven or unwoven ceramic fibers (which may be referred to as a "lay-up") using methods known in the art. The lay-up may include windings, braiding, and/or knotting of ceramic fibers, and/or may take the form of two-dimensional or three-dimensional fabrics or weaves, unidirectional fabrics, and/or non-woven textiles. The ceramic fibers are preferably continuous ceramic fibers suitable for weaving. The woven or unwoven ceramic fibers may be coated with an interphase coating (e.g., comprising pyrolytic carbon or boron nitride (BN)) before or after the preform is assembled. The interphase coating may serve as an interface between the ceramic fibers and the melt during melt infiltration and also as a compliant layer to enhance toughness and crack deflection in the final composite. The preform may then be rigidized by applying a ceramic coating thereto using a process such as chemical vapor infiltration. Thus, the ceramic fibers of the preform may be referred to as coated ceramic fibers, or interphase-coated ceramic fibers.

The ceramic fibers that serve as the framework of the preform and the porous outer layer, which become the CMC core and CMC outer layer, respectively, after melt infiltration, typically comprise silicon carbide, but may also or alternatively comprise another ceramic, such as silicon nitride, alumina or aluminosilicate, mullite, zirconia, carbon, a transition metal carbide, boron carbide, aluminum oxide and/or a transition metal intermetallic. Suitable silicon carbide fibers are commercially available from NGS Advanced Fibers (Toyama, Japan), COI Ceramics, Inc. (Magna, Utah), or Ube Industries (Tokyo, Japan), for example. The ceramic fibers may be crystalline or amorphous. Generally, speaking the ceramic fibers comprise a ceramic or other temperature-resistant material capable of withstanding high processing and use temperatures.

The particulate solids that (a) remain in the preform and (b) are deposited on the outer surface of the preform as a slurry-cast architecture after drying include ceramic particles and, optionally, reactive elements. Typically, the ceramic particles comprise silicon carbide, but they may also or alternatively include silicon nitride, alumina, aluminosilicate, and/or boron carbide or another refractory carbide. The reactive elements may include carbon and/or transition metals such as molybdenum, tungsten and/or titanium. The reactive elements can react with the molten material during melt infiltration and produce a ceramic reaction product that may form, along with the ceramic particles, the ceramic matrix of the CMC core upon cooling. The particulate solids, including the ceramic particles and any reactive elements, may have an average particle size in the range of from about 1 micron to about 25 microns to promote high reactivity during melt infiltration. The desired particle size may in some cases be attained by mechanical milling (e.g., ball milling with SiC media). The solid particulate matter may be obtained from any of a number of commercial sources, such as Sigma Aldrich (St. Louis, Mo.) or Alfa Aesar (Ward Hill, Mass.). As discussed above, the particulate solids within the preform may become part of the ceramic matrix of the CMC core after melt infiltration.

In a preferred embodiment, the both the ceramic fibers and the ceramic particles (and ultimately the ceramic matrix) comprise silicon carbide. The ceramic matrix composite (CMC) that is formed in this example may be referred to as a silicon carbide/silicon carbide or SiC/SiC composite. As used herein, the term "silicon carbide" refers broadly to the compound SiC as well as to other silicon-containing carbides.

The flowable carrier in which the particulate solids are suspended for injection into the mold may comprise an aqueous or organic solvent, such as water, ethanol, methanol, isopropyl alcohol, methyl ethyl ketone, or toluene. The introduction of the slurry into the mold may be carried out at room temperature or an elevated temperature. The flowable carrier may also or alternatively comprise a polymer, such as polyethylene glycol, acrylate co-polymers, latex co-polymers, and/or polyvinyl butyral, and/or a dispersant, such as ammonium polyacrylate, polyvinyl butyral, a phosphate ester, polyethylene imine, or BYK® 110 (BYK USA, Wallingford, Conn.).

The flowable carrier may be removed by drying at room temperature or an elevated temperature (e.g., from about 40° C. to about 150° C.). In some cases, such as when injection molding is used to introduce the slurry and a polymer is used as the carrier, the removal may require pyrolysis at several hundred degrees Celsius. The drying or pyrolysis may be carried out in an ambient environment (e.g., air) or a controlled environment, such as under vacuum conditions or in an inert gas atmosphere. As noted above, removal of the flowable carrier may occur shortly or immediately after introducing the slurry into the mold, or at a later time.

The temperature at which melt infiltration of the preform and/or the outer layer is carried out depends on the metal or alloy (typically silicon or a silicon alloy) forming the melt. In the case of silicon, which has a melting temperature ($T_m$) of 1414° C., the temperature may be from about 1410° C. to about 1500° C. Generally speaking, the temperature for melt infiltration is at or above $T_m$ of the metal or alloy. Typically, melt infiltration is carried out for a time duration of several minutes to hours, depending in part on the size and complexity of the preform. The presence of the slurry-cast architecture on the outer surface of the preform may enhance the flow of molten material over the outer surface, allowing infiltration of the preform to occur over multiple pathways, as described for example in U.S. Provisional Patent Application Ser. No. 62/158,978, filed May 8, 2015, which is hereby incorporated by reference.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

Although considerable detail with reference to certain embodiments has been described, other embodiments are possible. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages, and it is not necessarily expected that all of the described advantages will be achieved with every embodiment.

The invention claimed is:

1. A method of forming a CMC component with integral cooling, the method comprising:
    positioning a preform comprising a rigidized framework of ceramic fibers within a mold having an inner surface comprising a plurality of protrusions, the preform having a hollow shape enclosing at least one interior channel;
    introducing into the mold a slurry comprising particulate solids in a flowable carrier, the slurry (a) infiltrating the rigidized framework of ceramic fibers and (b) flowing over an outer surface of the preform and around the plurality of protrusions;
    removing the flowable carrier from the slurry, the particulate solids (a) remaining in the rigidized framework of ceramic fibers and (b) being deposited on the outer surface of the preform between the protrusions, thereby forming a porous slurry-cast architecture on the outer surface of the preform;
    removing the mold;
    forming a plurality of through-thickness cooling holes in the preform, the cooling holes forming a flow path from the at least one interior channel through the porous slurry-cast architecture and out of the preform.

2. The method of claim 1, further comprising, after removing the mold, infiltrating the preform with a molten material, thereby forming a CMC core.

3. The method of claim 1, wherein the porous slurry-cast architecture comprises slurry-cast pedestal features separated by recessed regions defined by the protrusions of the mold.

4. The method of claim 1, further comprising machining the porous slurry-cast architecture.

5. The method of claim 1, further comprising, after removing the mold, bonding a ceramic outer layer to the preform.

6. The method of claim 5, wherein the bonding comprises wrapping a prepreg tape around the porous slurry-cast architecture and then heating the prepreg tape.

7. The method of claim 5, further comprising infiltrating the ceramic outer layer with a molten material, thereby forming a CMC outer layer.

8. The method of claim 7, wherein infiltration of the preform and infiltration of the ceramic outer layer with a molten material are carried out simultaneously after the bonding, thereby forming a dual-walled CMC component comprising a CMC outer layer bonded to a CMC core.

9. The method of claim 8, further comprising forming a plurality of through-thickness cooling holes in the CMC outer layer, thereby extending the flow path from the interior channel through the CMC outer layer.

10. The method of claim 1, wherein infiltration of the preform and infiltration of a ceramic outer layer with a molten material are carried out separately to independently form a CMC core and a CMC outer layer.

11. The method of claim 10, further comprising bonding the CMC outer layer to the CMC core, thereby forming a dual-walled CMC component.

12. The method of claim 11, wherein the bonding comprises reactive brazing or diffusion bonding.

13. The method of claim 12, further comprising forming a plurality of through-thickness cooling holes in the CMC outer layer, thereby extending the flow path from the interior channel through the CMC outer layer.

14. The method of claim 1, wherein the introduction of the slurry into the mold comprises injection molding or gel-casting.

15. The method of claim 1, wherein the CMC component comprises a blade or vane of a gas turbine engine.

* * * * *